United States Patent Office 3,520,938
Patented July 21, 1970

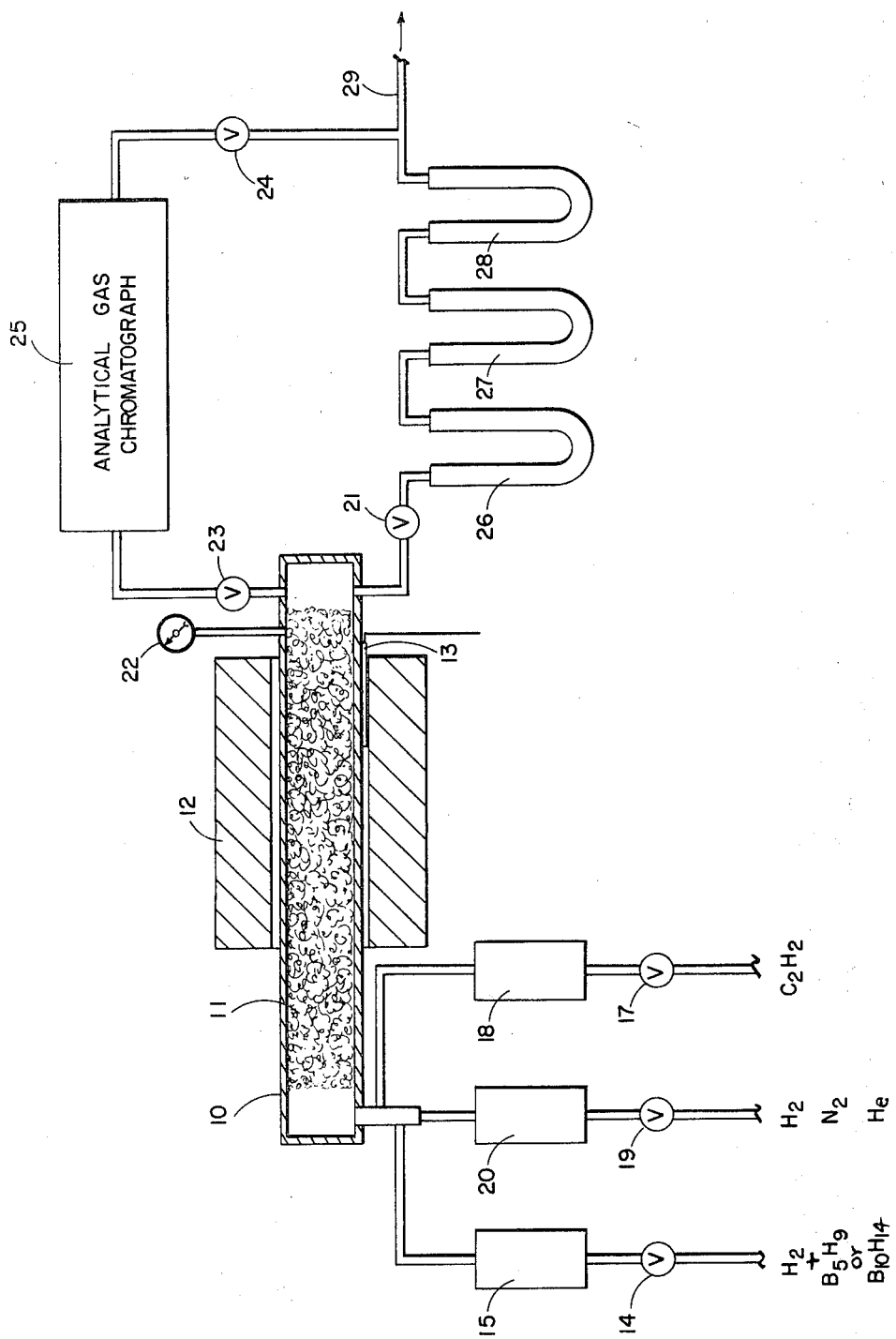

3,520,938
PROCESS FOR PRODUCTION OF CLOSO-CARBORANES
Jerome F. Ditter, Covina, and Robert E. Williams, La Canada, Calif., assignors to Aerojet-General Corporation, El Monte, Calif., a corporation of Ohio
Filed Mar. 29, 1968, Ser. No. 717,277
Int. Cl. C07f 5/02
U.S. Cl. 260—606.5    25 Claims

ABSTRACT OF THE DISCLOSURE

A short time method for producing closo-carboranes comprising reacting a borane and excess acetylene in a moderating atmosphere of a reaction zone maintained at an elevated temperature to produce high yields of closo-carborane products. The moderating atmosphere may be provided by (1) a diluent gas such as hydrogen, helium, nitrogen and the like, (2) loose packing (such as steel wool), or (3) a further excess of acetylene over that required to optimize yields and provided at a relatively low partial pressure, or combination thereof.

PRIOR ART

The closo-carboranes are relatively new materials. They have the empirical formula $C_2B_nH_{n+2}$, wherein $n$ varies from 3 to 10. The closo-carboranes are one of the most stable forms of carboranes. To date they have found use as portions of polymeric chains to produce high temperature elastomers and in another application are available as high temperature fluids. Additionally, the closo-carboranes could be a source for carrying boron inertly into various physiological environments. The first closo-carbornes discovered were those having from 3 to 5 boron atoms. These compounds were initially produced in almost trace amounts from pentaborane-9, $B_5H_9$, and acetylene, $C_2H_2$, in an electrical discharge reaction or in a flashing (controlled explosion) reaction. Next, a second group of closo-carboranes containing 10 boron atoms per molecule was produced from decarborane-14 and acetylene in a relatively high yield. However, in order to obtain the high yield, an elaborate multi-step synthesis was involved requiring selected solutions and several intermediates. The closo-carboranes have closed polyhedral structures, which in the case of the 10-boron carboranes is an icosahedral structure. This polyhedron lends itself to isomer structures, depending upon the placement of the carbon atoms. For example, isomers of the closo-carboranes containing 4 boron atoms, such as the 1,6- and 1,2-isomers, are known. There are three known isomers of the 10 boron closo-carboranes known as the 1,2-, 1,7- and 1,12-isomers or ortho-, meta- and para-isomers respectively. After the 10-boron closo-carboranes were discovered and synthesized, later workers made the closo-carboranes ranging from 6 to 9 boron atoms per molecule in relatively low yields requiring multi-step syntheses. Finally, a method was found to produce the 3- to 5-boron closo-carboranes in higher yields. However, the time of synthesis was over eighteen hours and involved a multi-step process. Thus, as can be seen, closo-carboranes have been made directly from boranes and acetylenes through a variety of methods. However, in those methods wherein moderate to high yields were obtained, long reaction times and/or multi-step syntheses were normally involved.

Disclosure of the invention

Thus, an object of this invention is to provide a method for producing selected closo-carboranes in high yields.

Another object of this invention is to produce selected closo-carboranes in a continuous single-step process.

Still another object of the invention is to provide a method for producing selected closo-carboranes in a short period of time while maintaining a high yield.

The above and other objects of this invention are accomplished by the herein method which comprises passing a selected borane and acetylene in excess of that stoichiometrically required to convert the borane to the closo-carboranes through a reaction zone, either in the presence of a diluent gas or in the presence of packing within the tube. The diluent gas which serves in a moderating role may be either a further excess of acetylene, hydrogen, or other inert gas such as helium or nitrogen. An open packing such as glass or steel wool will also provide a moderating atmosphere to forestall exposion and increase yields and may be used, if desired, in combination with the diluent gas. By controlling the emperature of the gases of the reaction zone, the pressure in the tube, and the residence time in the tube, the borane is converted to closo-carboranes in high yields. When both a diluent is present and the reaction zone is packed with a material such as steel wool, the yield of the closo-carboranes is significantly increased to the point where in some instances it is approximately doubled. It is pointed out that the herein method is applicable to producing closo-carboranes from selected initial boranes. It has been found, however, that diborane ($B_2H_6$) does not give the desired closo-carboranes in good yields, and it is believed that this is in part to the diborane dissociating and reacting with the acetylene as $BH_3$ groups. There are no closo-carboranes with less than three borons in their composition. Thus, boranes having more than two boron atoms are contemplated as starting materials. Practically, boranes and isomers thereof having over 10 boron atoms are not readily available for use in providing the closo-carboranes.

It is believed that the invention will be better understood from the following detailed description, specific examples, and accompanying drawing in which the figure is a schematic representation of the apparatus used to perform the process of this invention.

The method of the herein invention is typically accomplished through the utilization of a cylindrical tube of a predetermined length. The tube is closed at each end, having an inlet and outlet line therein. The reactants fed to the tube can be premixed or merely fed through joints directly to the inlet line to the reactor. Flowmeters on the individual reactant lines indicate the amount of reactant lines indicate the amount of reactant being fed. The outlet line from the reactor is directed to a series of cold traps to trap the products of the invention, which can be subsequently measured volumetrically and analyzed by gas chromatography techniques. In addition, one can periodically sample products being formed in the tube by tapping the line therefrom and directing same to a small analytical gas chromotography arrangement which withdraws small selected samples as the material forms. The tube in one preferred embodiment is surrounded by a resistive heater which is controlled by an electronic controller coupled to a variable voltage regulator so that the temperature in the tube can be maintained at a desired level.

Rather than directly heating the reaction tube, the heat of reaction may be supplied to the reaction zone through preheating of the diluent gas to an elevated temperature adequate to promote the reaction upon mixing and adequate to raise the borane to the reaction temperature.

One of the first boranes initially converted to closo-carboranes in accord with the method of this invention was the relatively available compound, pentaborane-9, with the empirical formula $B_5H_9$; utilizing a packed reactor, yields of closo-carboranes in excess of 70% based on the pentaborane-9 consumed have been obtained. It has been found that in all instances pentaborane-9 yields three closo-carboranes in a relatively fixed ratio to each other. For example, under conditions of the herein method, a typical yield based on the pentaborane-9 consumed is about 6% $C_2B_3H_5$, 31% $C_2B_4H_6$, and 33% $C_2B_5H_7$. The aforegoing percentages vary according to reaction parameters. However, as indicated, the relative amounts of the three products to each other stay about the same, regardless of the overall yield of product. The formation of the closo-carboranes from pentaborane-9 was studied at length to determine the various reaction parameters. It was subsequently found that with the exception of the optimum temperature the same parameters essentially applied to other starting boranes, such as decaborane-14, to form additional closo-carboranes. Other boranes that may be used as reactants in the process of the invention include tetraborane, hexaborane, octaborane and nonaborane. However, it should be pointed out that for each borane utilized as a starting material, the optimum conditions to form closo-carboranes can and most often would vary slightly, but are easily determinable by one skilled in the art when practicing the invention as set forth herein.

Only small amounts of closo-carboranes are produced, for example, from the pentaborane-9 reaction with acetylene in the tube reactor at 350° C. Not until 400° is reached does substantial conversion to the closo-carboranes result. A more useful temperature range is between 475° C. and 525° C. Optimum yields are found to be in the range of 490° C. to 500° C. At the foregoing temperatures for producing high yields of products, it was normally felt before this invention that only an explosion would result between acetylene and the borane. It was perhaps for this reason that such elevated temperatures were avoided in an attempt to form satisfactory closo-carboranes prior to the herein invention. It was discovered that the explosion not only could be avoided but moderate yields of this invention obtained when a considerable excess of acetylene was utilized and desirably a moderating atmosphere provided by either a significant amount of an inert diluent gas such as helium, hydrogen and the like, or packing in the reactor; a high yield could be obtained when both inert diluent and packing were employed. The optimum temperature of the reaction will vary with different boranes, ratios of reactants and diluent gas and other parameters but generally will be within the range of 350° C. to 900° C., usually less than 700° C. and in excess of 400° C.

It was found that a high acetylene to borane mole ratio is preferably utilized to optimize yield and to forestall explosions. Thus, a significant excess over that stoichiometrically required is desirably used. A mole ratio of acetylene to borane of 3 to 1 produces good results, while a mole ratio of 8–9 to 1 is even better, regardless of the presence or absence of packing. However, it was found that when the mole ratio was increased, for example, to 12 to 1, no significant increase in performance was achieved. Thus, for the acetylene-pentaborane system a mole ratio of 8–9 to 1 is sufficient to produce superior results and at this ratio, the excess acetylene provides significant moderating effect. The moderating atmosphere may be further enhanced by the presence of a substantial amount of an inert gas such as hydrogen, helium, nitrogen and the like, and/or a packing within the reactor to increase significantly the surface area therein. The diluent gas and/or packing not only prevents the possibility of an explosion, but further probably minimizes local hot spots and consequent local chemical reactions so that undesirable by-products would not appear because of non-optimum conditions at those spots.

The amounts of the inert diluent gas, if used, can vary from a mole ratio of about 4 to 1 up to at least 40 to 1, based upon the volume of borane present. At the higher amount of inert diluent gas, namely, 40 to 1, it has been observed that a higher percent yield of the desired closo-carboranes is obtained whether or not the reactor is packed. Although greater excesses of diluent gas above the 40 to 1 mole ratio may be employed to produce equivalent or even slightly higher yields, the concomitant added processing burden is not deemed worth the minor potential improvement.

It is necessary that the reactants achieve the foregoing reaction temperatures within the reactor; thus the residence time within the reactor must be sufficient for this to be accomplished. As can be appreciated, the ability to achieve the reaction temperature within a given time period is dependent upon various parameters which include presence or absence of preheating, mode of heating, and reactor geometry. It is believed that it is merely required that the reactants be brought up to the reaction temperature and held there for the shortest practical period of time in order to avoid deleterious side reactions.

In a reaction having dimensions of 0.62 inch diameter by 13 inches in length, it was found that the nominal residence time of the reactants in the tube can vary from about ½ to about 1 second. It has been found in the aforegoing reactor that with the acetylene/pentaborane-9 system nominal residence times much above 1 second at a temperature over 350° C. cause undesirable side reactions to occur and cause a decrease in the yield. Additionally, in the temperature ranges investigated, it is found that the amount of unreacted pentaborane-9 in the effluent stream becomes appreciable if the residency is much below ½ second. For any borane-acetylene system it would be well within the skill of the art to determine a maximum residence time of reactants in a given tube reactor by correlating that time to percent yield of desired end products.

As previously indicated, packing of the reactor can serve as a substitute for the diluent gas to prevent explosions from occuring. However, it is found that the yield in the pentaborane-9 acetylene system to produce the closo-carborane is optimized when the reactor is packed with a packing such as steel wool together with the use of diluent gas, preferably an inert gas such as hydrogen, helium or nitrogen. The packing as previously indicated has a direct effect upon the yield. For example, it was found that packing can approximately double the yield over unpacked reactor. Moreover, the tighter the packing the greater the increase in yield. However, the packing density within any reactor is limited. Further, the packing with time tense to clog from the production of the by-products of this reaction and normally has to be replaced periodically. The more packing, the more often it will have to be replaced, thus a balance has to be struck. It has been found that a reasonable amount of packing is, namely, that which uniformly occupies up to about 5% of the volume.

One atmosphere or less appears to produce excellent yields at the aforegoing packing level. Above one atmosphere, one is increasing the amount of reactants without increasing the packing. It can be appreciated that the yield percentages may drop due to the minimized effect of the packing. Also, operation at one atmosphere is an advantage for construction and safety considerations. Without any packing in the reactor and an excess of inert diluent gas, one could operate the system at pressures in excess of one atmosphere, for example, 2 or 3 atmospheres or even more, to produce larger quantities of products per unit time. However, the higher pressures are generally avoided due to the increased possibility of explosion. Also, regardless of the possibility of explosion, the process penalty for the excess inert diluent gas would make the process less economical. From a practical standpoint, in an unpacked system the pressure should not exceed a few atmospheres. It should be pointed out, however, that good yields of closo-carboranes can be obtained at pressures as low as 250 torr or even lower, but of course, the quantity processed in a given time drops significantly.

Thus, in view of the aforegoing discussion, one can more readily appreciate the interplay of the various reaction parameters involved such that one skilled in the art can apply the principle of this invention to various borane systems. The first step in producing the maximum yield is to choose a ratio of acetylene to borane such that there is sufficient excess of acetylene to produce a complete reaction to the closo-carborane, as well as inhibit to a great degree the possibility of an explosion. Excess acetylene may be used as the sole moderating diluent at low partial pressures, preferably not exceeding standard safety practices of about two atmospheres absolute, but preferably an amount of an inert diluent gas is added to the two aforegoing reagents to assure completely the impossibility of an explosion occurring at the necessary reaction temperatures and within desirable pressure ranges and to improve the yield. Alternatively, an open packing formed of inert material alone could achieve results similar to that achieved by using an inert diluent gas. Moreover, when all three reagents are formed through a packed reactor at a selected temperature, pressure and residence time, a maximum yield of the end closo-carborane products will be produced. Selection of the reaction temperature is generally not dependent upon the pressure and thus it can be determined separately so that the optimum reaction temperature would be set. Then the pressure of the three reagents in the reactor will be determined in relationship with the amount of packing material that can be feasibly and practically utilized. Finally, the residence time for the reagents in the reactor will be selected to bring them to the determined reaction temperature. The reactor should be packed with steel wool or the like in order to provide the high yields previously indicated.

As has been indicated, the major produces formed from the pentaborane-9 acetylene reaction were $C_2B_3H_5$, $C_2B_4H_6$, and $C_2B_5H_7$. In addition to these three closo-carboranes, minor to trace amounts of methyl and polymethyl derivatives of the same materials are produced as well as trace amounts of another closo-carborane $C_2B_6H_8$ and a methyl derivative thereof. It should be pointed out that the alkyl or polyalkylated derivatives of the closo-carboranes can be prepared in much higher yields as has been done in other previous methods by mere substitution of the equivalent alkyl or polyalkyl pentaborane and/or alkyl or dialkyl acetylenes as initial reactants. The alkylated closo-carboranes have been found to be even more stable than the plain closo-carboranes and thus are of potential interest from that standpoint.

When decaborane-14, $B_{10}H_{14}$, is substituted for the pentaborane-9 in the method of the invention, three isomers, $1,2\text{-}C_2B_{10}H_{12}$, $1,7\text{-}C_2B_{10}H_{12}$ and $1,12\text{-}C_2B_{10}H_{12}$ are produced. The relative ratio of acetylene to inert diluent gas to borane remains approximately the same. The remaining parameters of the reaction except for temperature also are quite similar for this system as previously discussed for the pentaborane one. However, it is found that unlike in the pentaborane system, one can control to a greater extent the relative amounts of the products produced from the decaborane. At the temperature of about 500° C. the resulting product contains a major proportion of the 1,2-isomer along with a lesser amount of the 1,7-isomer. At longer residence times and/or higher temperatures the major isomer becomes the 1,7-isomer while the 1,2-isomer yield decreases and small amounts of the 1,12-isomer are detected. At higher temperatures, while maintaining a reasonable yield, the distribution tends to favor more 1,12-isomer and less 1,2-isomer; however, the major product remains the 1,7 isomer. At 850° C. the yield of the 1,12- and 1,7-isomers are roughly equivalent; however, the yield drops rather precipitiously. These results are in accordance with earlier work which demonstrated that the 1,2-isomer may be converted at elevated temperatures to the 1,7- and 1,12-isomers. Thus, it has been found that in the decaborane system there is a built-in control enabling one to choose within the aforementioned limits the isomer distribution of the closo-carboranes produced.

As indicated, steel or glass wool or other inert wool will serve as suitable packing material. However, it should be apparent that any inert packing which will increase the surface area within the reactor is suitable. Such packing could include other fibrous products as well as spherical-shaped or powdered forms of packing. The particular advantage of the fibers is that a good and sufficient increase in surface area can be achieved without greatly diminishing the volume in the reactor so as to affect the rate of throughput of reactants.

The three reagents entering the reactor (boron, acetylene and inert diluent) may be premixed in any number of ways as follows:

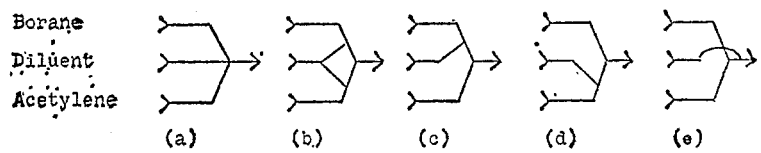

Alternatives (b) and (c) involve producing stream of borane and diluent (no acetylene) at one point. Since it is old in the art that boranes $[B_nH_n(BH_3)_x]$ including diborane may be thermally decomposed to produce hydrogen and higher boranes (with the value of $n$ increasing in the pyrolysis reaction in the foregoing formula), it is obvious that such a product stream could be mixed with acetylene (see c above) or with an acetylene-diluent mixture (see b above) prior to introduction into the closo-carborane synthesis. It will be appreciated that the foregoing alternatives afford several different opportunities for preheating of the diluent and/or acetylene and thus obviating the need to heat the reaction zone itself.

EXAMPLE I

The test apparatus used to perform this and the other examples is seen in the single figure. A stainless steel tube reactor 10 of about 0.62 inch I.D. was packed with about 20–25 grams of Rhodes Grade 2 steel wool 11. The packed tube was placed within a Hoskins electric tube furnace 12 which has a heated cavity thirteen inches long with a 1⅜ inch diameter. As can be seen the packing 11 extended beyond each end of the reaction zone. The unpacked volume of the heated zone within the reactor was about 68 cc. This was reduced to about 65 cc. by the steel wool. The temperature at the reactor wall was measured by a thermocouple 13 placed against the outside wall of the reactor in the annulus between the reactor wall and the furnace wall.

perature of the chromatographic column was 55° C. at the time of injection and was programed to increase at the rate of 2° C. per minute. This analysis provided information on the relative distribution of unreacted acetylene, ethylene, other hydrocarbons and the products $C_2B_3H_5$, $C_2B_4H_6$ and $C_2B_5H_7$ along with trace quantities of related methyl derivatives of the closo-carboranes.

The results of this example are seen in the following table:

TABLE I

|  | Example I | Example II | Example III | Example IV | Example V | Example VI | Example VII |
|---|---|---|---|---|---|---|---|
| Pentaborane-9 (mole ratio) | 1 | 1 | 1 | 1 |  |  |  |
| Decaborane-14 (mole ratio) |  |  |  |  | 1 | 1 | 1 |
| Acetylene (mole ratio) | 8 | 4 | 8 | 8 | 11 | 14 | ~20 |
| Hydrogen (mole ratio) | 40 | 40 |  | 43 | 40 | 40 | 40 |
| Pentaborane-9 consumed (cc.) | 295 | 68.1 | 303.1 | 285 |  |  |  |
| Decaborane-14 consumed (millimoles) |  |  |  |  | 8.71 | 3.77 | 3.77 |
| Closo-carboranes formed | ¹ 210 | ¹ 19.1 | ¹ 93 | ¹ 208 | ² 5.01 | ² 2.82 | ² 0.228 |
| Percent yield (mole-to-mole basis) | 71 | 28 | 31 | 73 | 58 | 75 | 6 |
| Percent $C_2B_3H_5$ formed | 8 | 9.4 | 10.3 | 9 |  |  |  |
| Percent $C_2V_4H_6$ formed | 45 | 45.4 | 45.4 | 44 |  |  |  |
| Percent $C_2B_5H_7$ formed | 47 | 45.2 | 44.3 | 47 |  |  |  |
| Percent o-$C_2B_{10}H_{12}$ formed |  |  |  |  | 3.8 | 8.8 | 0.5 |
| Percent m-$C_2B_{10}H_{12}$ formed |  |  |  |  | 95.4 | 88.8 | 2.6 |
| Percent p-$C_2B_{10}H_{12}$ formed |  |  |  |  | 0.8 | 2.4 | 2.6 |
| Nominal residence time (sec.) | 0.5 | 0.9 | 0.6 | 0.5 | 0.75 | 0.59 | 0.37 |
| Temperature (° C.) | 490 | 460 | 495 | 490 | 650 | 650 | 850 |
| Pressure | ³ 1 | ⁴ 50 | ⁴ 140 | ³ 0.5 | ³ 0.5 | ³ 1 | ³ 1 |
| Packing | (⁵) | None | (⁵) | (⁵) | (⁵) | (⁵) | (⁵) |

¹ Cubic centimeters.
² Millimoles.
³ Atmospheres.
⁴ Torr.
⁵ Steelwool.

A manifold was set up to allow various gases and/or gas mixtures to be introduced into the reactor. In the present example a gaseous mixture of $B_5H_9$ and $H_2$ was prepared and calibrated and introduced through needle valve 14 through a #603 Matheson flowmeter 15, and pre-purified acetylene was added through valve 17 and #602 Matheson flowmeter 18. Not utilized in the present example was provision for adding additional diluent gases ($H_2$ or $N_2$) from a tank via needle valve 19 through other calibrated flowmeters 20 into a line leading to the reactor. The mixture of $B_5H_9$ and $H_2$ was prepared by introducing the $B_5H_9$ into a 16-liter stainless steel vessel at ~150 torr, following which $H_2$ or other diluent gas was added to the system at pressures above its room vapor pressure (160–200 torr).

In this example a mixture of 40:1 of hydrogen and pentaborane-9, $B_5H_9$, flowing at a rate of 2400 cc./min. (calculated for standard temperature and pressure conditions) was mixed with acetylene (475 cc./min. STP), and these reactants were then allowed to flow through the reactor. The pressure was fixed at one atmosphere absolute by manual adjustment of valve 21 while the pressure was recorded on pressure gauge 22. The temperature of the furnace which was 490° C. was regulated by means of a West "Guardsman" controller, equipped with an iron-constantan thermocouple 13, coupled through a Variac to the furnace.

An analysis of an aliquot portion of the hot effluent gases was obtained by opening valves 23 and 24, transiently closing valve 21, to force the product stream through the sample loop of a gas chromatograph 25. The effluent gases from the reaction zone were passed through cold traps 26, 27, and 28 maintained at liquid nitrogen temperatures, wherein the condensable products were stripped from the stream. The traps were connected to a vacuum line 29, wherein the condensed products could be handled for vacuum fractionation, volume measurement and/or vapor phase chromatographic analysis.

The "on-stream" chromatographic analysis involved injection of a 10 cc. gas sample into a quarter inch O.D. by 20-foot column of Apiezon-N on Chromosorb-P (60/80 mesh) in a commercial F & M Gas Chromatograph equipped with a thermal conductivity detector. The tem-

EXAMPLE II

The apparatus and procedure of Example I was repeated. However, an unpacked reactor was utilized A mole ratio of pentaborane to acetylene to hydrogen of 1:4:40 was used. The results and specific conditions of this example are seen in the above table.

EXAMPLE III

The apparatus and procedure of Example I was utilized to determine the effect of using a packed reactor and no inert diluent gas. The ratio of pentaborane-9 to acetylene was 1:8. The results and specific conditions of this example are found in the above table.

EXAMPLE IV

Example I was repeated, using essentially the same conditions and ratio of reactants. However, the pressure was reduced in half from 1 atmosphere to .5 atmosphere. As can be seen from the results tabulated in the above table, the yield was about the same obtained from the conditions of Example I.

EXAMPLE V

The apparatus and procedure of Example I was again utilized to produce closo-carboranes consisting of isomers of $C_2B_{10}H_{12}$. A 58% yield based upon the decaborane-14 utilized was obtained at the conditions listed in the above table.

EXAMPLE VI

The procedure of Example V was repeated to obtain closo-carboranes from decaborane-14. The main difference between this example and Example V was the increase in acetylene to borane ratio and the increase in pressure. An increase in yield from 58 to 75% based upon the decaborane-14 is noted.

EXAMPLE VII

The procedure of Example VI of the accompanying table was repeated but using a much less total amount of decaborane (shorter run) and higher temperature of reaction. The total percent yield dropped significantly, due to the higher temperature, but the relative amount of the 1,12-isomer formed increased to the point where it was equal to that of the 1,7-isomer.

When the aforegoing examples using packing were repeated utilizing glass wool to pack the reactor, there was again a significant improvement in yield over the unpacked reactor.

The foregoing description of this invention, particularly with regard to the various parameters set forth, has been based in the most part upon obtaining yields of closo-carboranes in excess preferably of 25% (based upon the starting borane) in a single step in seconds. As is apparent, the herein invention in one embodimet produces closo-carboranes in yields of 60 to 70%. However, it is noted that yields in excess of 25% utilizing the simplified approach set forth herein significantly advances the art. Thus, the reaction conditions and parameters discussed above have been based on this fact. If one were satisfied with yields below 25% as in Example VII, it should be apparent that relaxation of the parameters would obviously achieve this.

While several embodiments of the invention have been illustrated and described, it will be understood that the invention should not be construed as being limited thereto, but only to the lawful scope of the appended claims.

We claim:
1. A method of producing closo-carboranes comprising:
reacting acetylene and a borane having from 3 to 10 boron atoms in a reaction zone maintained at a temperature in excess of about 350° C. in a moderating atmosphere to form closo-carborane, said moderating atmosphere serving to forestall explosion and to increase the yield of carboranes and recovering a closo-carborane product.

2. The method of claim 1 wherein the acetylene is provided in an excess above that stoichiometrically required to react with the borane.

3. The method of claim 1 wherein the moderating atmosphere within the reaction zone is provided at least in part by an inert diluent gas.

4. The method of claim 3 comprising maintaining a mole ratio of inert diluent gas to borane of at least 4:1.

5. The method of claim 1 wherein the moderating atmosphere within the reaction zone is provided at least in part by a loose packing, said packing serving to increase the effective surface area therein.

6. The method of claim 1 wherein the moderating atmosphere within the reaction zone is provided at least in part by a loose packing within said zone and by an inert diluent gas, said loose packing acting to increase the effective surface therein.

7. The method of claim 1 wherein the moderating atmosphere is provided at least in part by maintaining a mole ratio of acetylene to borane of at least 8:1.

8. The method of claim 2 wherein the mole ratio of acetylene to borane is at least 3:1.

9. The method of claim 2 wherein the ratio of acetylene to borane is between 6:1 and 12:1.

10. The method of claim 1 wherein the reaction temperature is in the range of about 350° C. to about 900° C.

11. A method in accordance with claim 1 wherein the borane is pentaborane-9.

12. A method in accordance with claim 1 wherein the borane is decaborane-14.

13. A method in accordance with claim 1 wherein the temperature in the reaction zone is in the range of 400° C. to 700° C.

14. A method in accordance with claim 1 wherein the temperature in reaction zone is in the range between 475° C. to 525° C.

15. A method of producing closo-carboranes comprising:
providing a heated reaction zone;
providing acetylene and an inert diluent gas, and a borane having from 3 to 10 boron atoms to said reaction zone;
maintaining a mole ratio of acetylene to borane of at least 3:1 and a mole ratio of inert gas to borane of at least 4:1;
maintaining said reaction zone at a temperature within the range of about 350° C. to about 900° C. to produce closo-carborane; and
recovering said closo-carborane formed.

16. The method of claim 15 wherein the acetylene to borane mole ratio is in the range of about 6:1 to 12:1.

17. The method of claim 16 wherein the acetylene to borane mole ratio is about 8:1.

18. The method of claim 15 wherein the reaction zone is provided with a loose packing to increase the surface area therein.

19. The method of claim 15 wherein the borane provided to the reaction zone is pentaborane-9 and acetylene is present in a mole ratio of at least about 8:1 based on said pentaborane-9.

20. The method of claim 19 wherein the inert diluent gas is present in the reaction zone in a mole ratio of at least about 40:1 based on said pentaborane-9.

21. The method of claim 15 wherein the borane is decaborane-14 and the reaction zone is maintained at a temperature of at least 500° C. and the recovered closo-carboranes produced include the 1,2- (ortho-), the 1,7- (meta-), and the 1,12- (para-) isomers of closo-dicarbadodecaborane-12, $C_2B_{10}H_{12}$.

22. A method in accordance with claim 15 wherein the borane is pentaborane-9.

23. A method in accordance with claim 15 wherein the borane is decaborane-14.

24. A method in accordance with claim 15 wherein the temperature in the reaction zone is in the range of 400° C. to 700° C.

25. A method in accordance with claim 15 wherein the temperature in reaction zone is in the range between 475° C. to 525° C.

References Cited
UNITED STATES PATENTS

| | | | |
|---|---|---|---|
| 3,159,681 | 12/1964 | Stange et al. | 260—606.5 |
| 3,164,639 | 1/1965 | Weilmuenster et al. | 260—606.5 |
| 3,293,303 | 12/1966 | Lawton et al. | 260—606.5 |
| 3,316,306 | 4/1967 | Chiras et al. | 260—606.5 |
| 3,355,496 | 11/1967 | Schoenfelder et al. | 260—606.5 |
| 3,376,347 | 4/1968 | Fein et al. | 260—606.5 |
| 3,383,419 | 5/1968 | Heying et al. | 260—606.5 |
| 3,420,889 | 1/1969 | Onak | 260—606.5 |

TOBIAS E. LEVOW, Primary Examiner

W. F. W. BELLAMY, Assistant Examiner